United States Patent

Weisel et al.

(10) Patent No.: US 12,481,878 B2
(45) Date of Patent: Nov. 25, 2025

(54) APPLYING A TWO DIMENSIONAL (2D) KERNEL ON AN INPUT FEATURE MAP

(71) Applicant: Mobileye Vision Technologies Ltd., Jerusalem (IL)

(72) Inventors: Orly Weisel, Efrat (IL); Yaniv Fais, Tel Aviv (IL); Shira Hirsch, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 765 days.

(21) Appl. No.: 17/884,948

(22) Filed: Aug. 10, 2022

(65) Prior Publication Data

US 2023/0046558 A1 Feb. 16, 2023

Related U.S. Application Data

(60) Provisional application No. 63/231,529, filed on Aug. 10, 2021.

(51) Int. Cl.
*G06N 3/08* (2023.01)
*G06N 3/063* (2023.01)

(52) U.S. Cl.
CPC .............. *G06N 3/08* (2013.01); *G06N 3/063* (2013.01)

(58) Field of Classification Search
CPC ......... G06N 3/063; G06N 3/0464; G06N 3/08
See application file for complete search history.

(56) References Cited

U.S. PATENT DOCUMENTS 11,227,207 B1 * 1/2022 Nama .................... G06N 3/084
2021/0295138 A1 * 9/2021 Symes .................... G06N 3/04

* cited by examiner

*Primary Examiner* — John R Wallace
(74) *Attorney, Agent, or Firm* — Schwegman Lundberg & Woessner, P.A.

(57) ABSTRACT

A method, integrated circuit, and a computer readable medium that stores instructions for reducing IO traffic from a global or remote memory unit to a buffer of a neural network unit, by using overlap rows of an input feature map tile.

19 Claims, 9 Drawing Sheets

APPLYING A TWO DIMENSIONAL (2D) KERNEL ON AN INPUT FEATURE MAP

BACKGROUND

This application claims the benefit of priority to U.S. Provisional Patent Application Ser. No. 63/231,529, filed Aug. 10, 2021, which is incorporated by reference herein in its entirety.

BACKGROUND

Artificial Intelligence (AI) and specifically the domain of Deep Learning (DL) have become very popular. Many workloads use Convolution Neural Networks (CNNs) in real time applications. The implementation of CNNs requires massive computational resources but also consumes vast amount of data. This presents a major challenge in meeting the latency and throughput required when inferring such workloads.

In many cases, the compute tasks are accelerated by dedicated accelerators for deep learning, but the transfer of the vast amount of data remains a bottleneck.

A majority of accelerators have a buffer aimed to speed up the computation. Nevertheless, the transferring of the data from and to a larger memory unit (such as a dynamic random access memory DRAM) is time consuming.

The buffer is also much smaller than an input feature map (IFM) that should be processed by the CNN. This requires the IFM to be segmented to multiple IFM tiles.

When processing a certain IFM tile (to provide an output feature map (OFM) tile), and using a 2D kernel, there are some calculations that require rows of more than a single IFM tile. This requires loading these rows multiple times, one per each calculated OFM tile.

There is a growing need to reduce the input/output (I/O) bottle neck associated with processing IFMs.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

There are provided systems, methods, as illustrated in the claims and the specification.

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor and the like.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
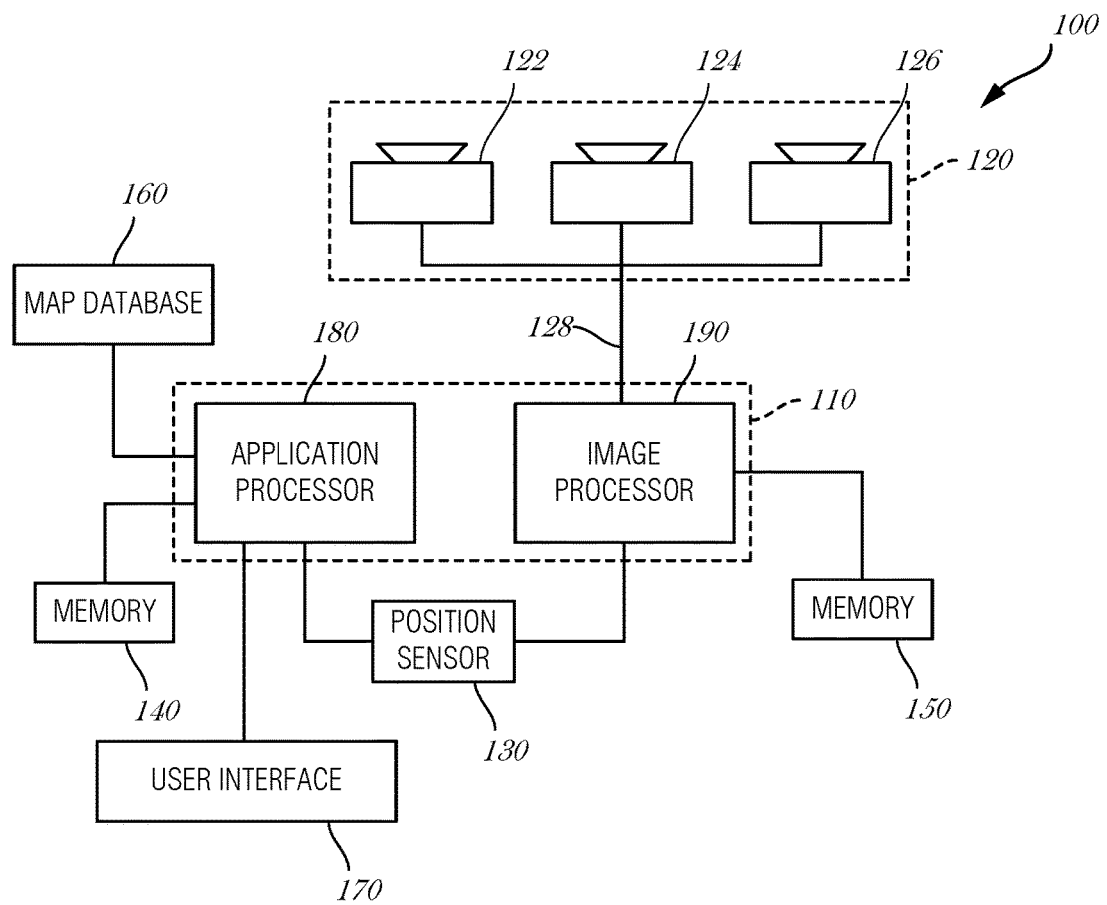
FIG. 1 is a block diagram representation of a system consistent, according to an embodiment.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device.

Any reference to a system should be applied mutatis mutandis to an integrated circuit.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Some of the following examples may refer to a convolution. It should be noted that any reference to a convolution may be applied mutatis mutandis to de-convolution.

Some references are made to a neural network. The neural network may be a convolution neural network or another neural network.

A neural network (NN) processor is a hardware accelerator that is configured to perform neural network processing. The NN processing may include any operation executed by a neural network. For example, a CNN processor may execute convolutions, and especially perform a sliding dot product or cross-correlation. The NN processor is expected to perform NN calculation in a manner that is more efficient than a central processing unit (CPU).

A NN has multiple layers, and each layer may be viewed as receiving IFM tiles of the layer, and calculating OFM tiles of the layers. The OFM tile of one layer may be an IFM tile of another layer. The first layer may process an IFM, one or more input images, raw or preprocessed sensed information, or combinations of these types of inputs.

The calculation of an OFM tile may include scanning one or more IFM tiles with a 2D kernel. Scanning may be performed, for example, using a raster scan pattern or a progressing scanning technique.

Using a 2D kernel may require one or more rows (also referred to as overlap current IFM tile rows) of a current IFM tile to be fetched for calculating a current OFM and also to fetched for calculating a next OFM.

Instead of this double fetch, which adds to the I/O bottleneck, it is described here to fetch the overlap current IFM tile rows only once and maintain them in the buffer until (at least) a completion of any calculation related to the next IFM tile that requires them. Other rows of the current IFM tile can be deleted (e.g., overwritten) after (or even before) the completion of the calculation of the current OFM tile. This increases the utilization efficiency of the buffer.

The buffer may store two or more IFM tiles.

OFM tiles may be stored in one or more other buffers or may be sent to an external memory unit, and the like.

The convolution kernel operations described herein provide systems and methods that can be used as part of or in combination with autonomous navigation, autonomous driving, or driver assist technology features. As opposed to fully autonomous driving, driver assist technology may refer to any suitable technology to assist drivers in the navigation or control of their vehicles. Examples of driver assist technology include Forward Collision Warning (FCW), Lane Departure Warning (LDW), Traffic Sign Recognition (TSR), and other driver assist technologies. The convolution kernel operations described herein may receive inputs from various sensors, such as one or more cameras mountable in a vehicle and an associated processor that monitors the environment of the vehicle, depth sensors (e.g., lidar, radar), and additional types of sensors and associated processors mounted in the vehicle. In some examples of the presently disclosed subject matter, the system may provide techniques for processing images of an environment in advance of a vehicle traversing a road, where the processing including training neural networks or deep learning algorithms to estimate a future path of a vehicle based on images. In yet further examples of the presently disclosed subject matter, the system may provide techniques for processing images of an environment in advance of a vehicle traversing a road using a trained neural network to estimate a future path of the vehicle. In particular, the convolution kernel operations described herein provide improved object detection, improved classification of object (e.g., cars, pedestrians), improved object distance estimation (e.g., depth estimation), improved identification and annotation of vehicular navigation "free space" (e.g., nearby roads, sidewalks), and improved detection and identification of traffic signs and road user behaviors (e.g., walking direction of nearby pedestrians).

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition units and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition unit 120. For example, data interface 128 can include any wired and/or wireless link or links for transmitting image data acquired by image acquisition unit 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, controllers, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP® and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units 140, 150 can include random access memory, read only memory, flash memory, disk drives, optical storage, tape storage, removable storage, and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices, and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system (e.g., throttling system 220, braking system 230, and steering system 240 of FIG. 2E).

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a radio frequency (RF) sensor (e.g., radar transceiver), a LIDAR sensor. Such sensors can be used independently of or in cooperation with the image acquisition unit 120. For example, the data from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image data from the image acquisition unit 120, or some processed variation or derivative of the image data from the image acquisition unit 120.

Figure 2A:
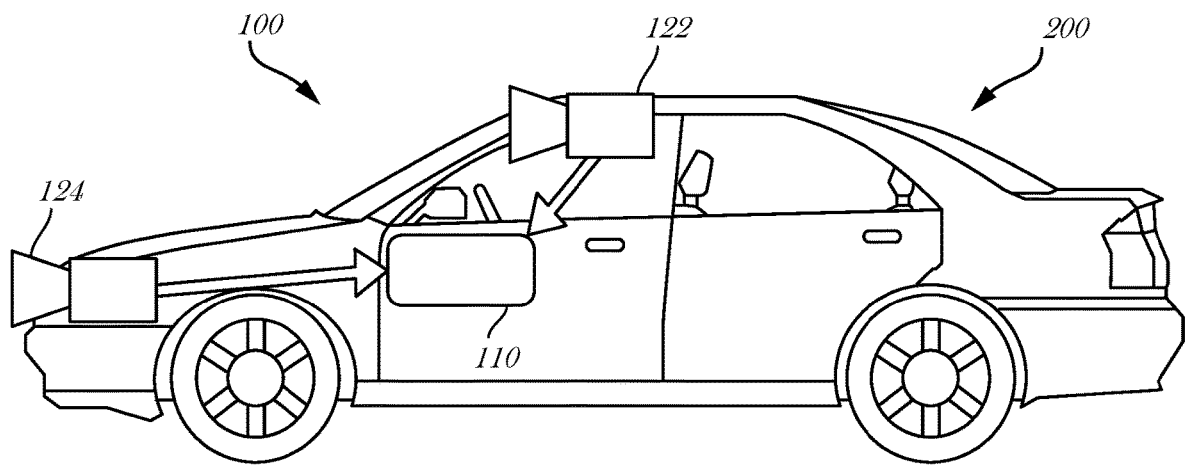
FIG. 2A is a diagrammatic side view representation of an exemplary vehicle including a system, according to an embodiment.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments, vehicle 200 can be equipped with only a single image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
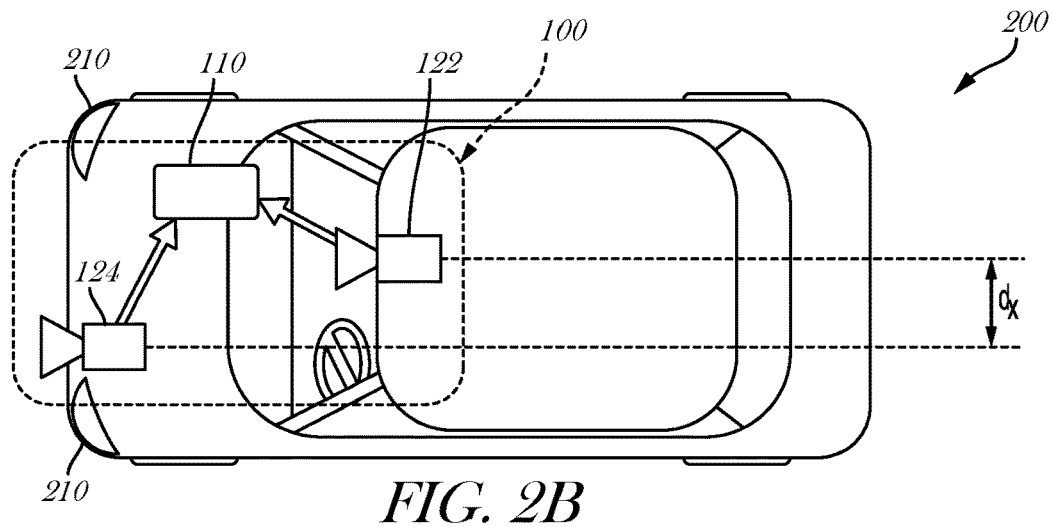
FIG. 2B is a diagrammatic top view representation of the vehicle and system shown in FIG. 2A, according to an embodiment.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
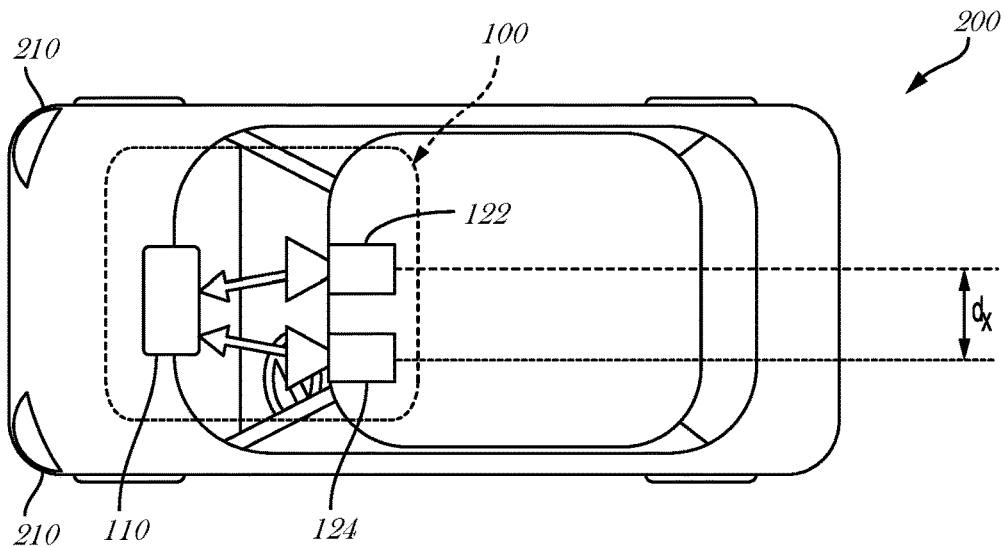
FIG. 2C is a diagrammatic top view representation of another embodiment of a vehicle including a system, according to an embodiment.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
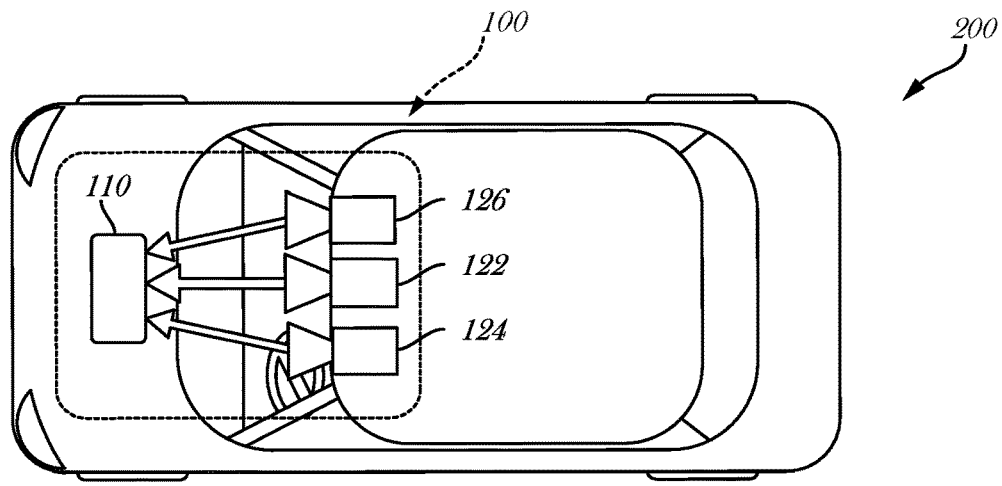
FIG. 2D is a diagrammatic top view representation of yet another embodiment of a vehicle including a system, according to an embodiment.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
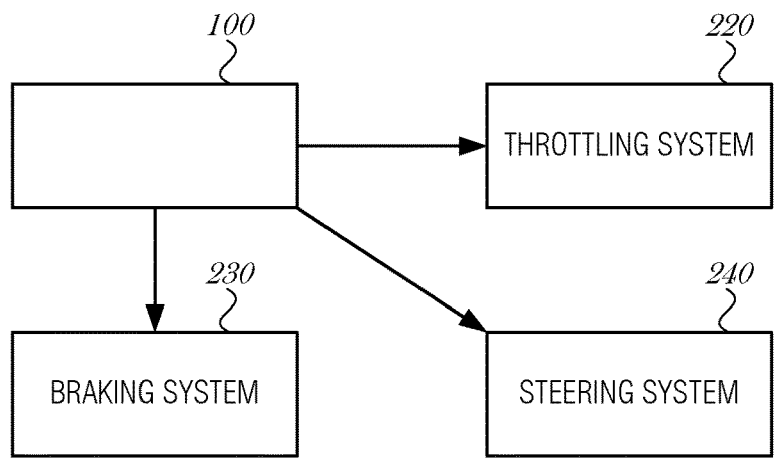
FIG. 2E is a diagrammatic representation of exemplary vehicle control systems, according to an embodiment.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 1200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
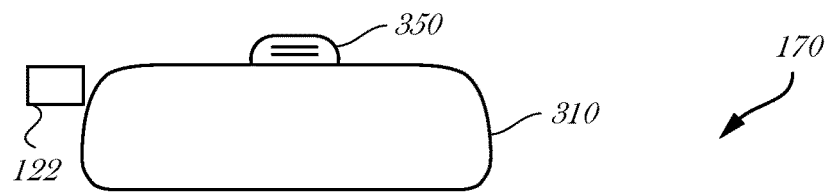
FIG. 3 is a diagrammatic representation of an interior of a vehicle including a rearview mirror and a user interface for a vehicle imaging system, according to an embodiment.
Figure 3:
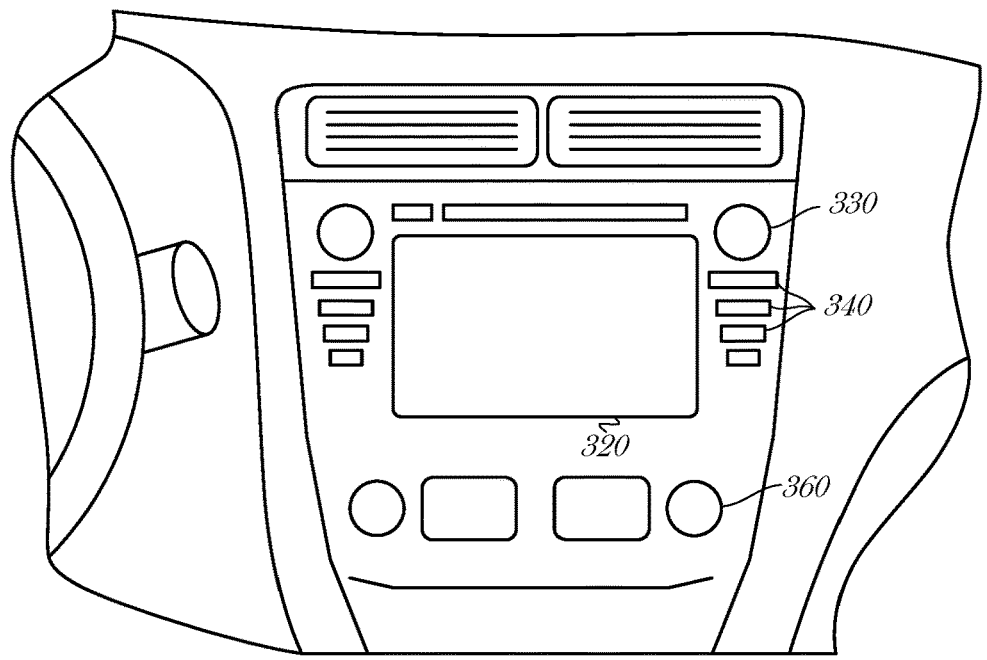

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Figure 4:
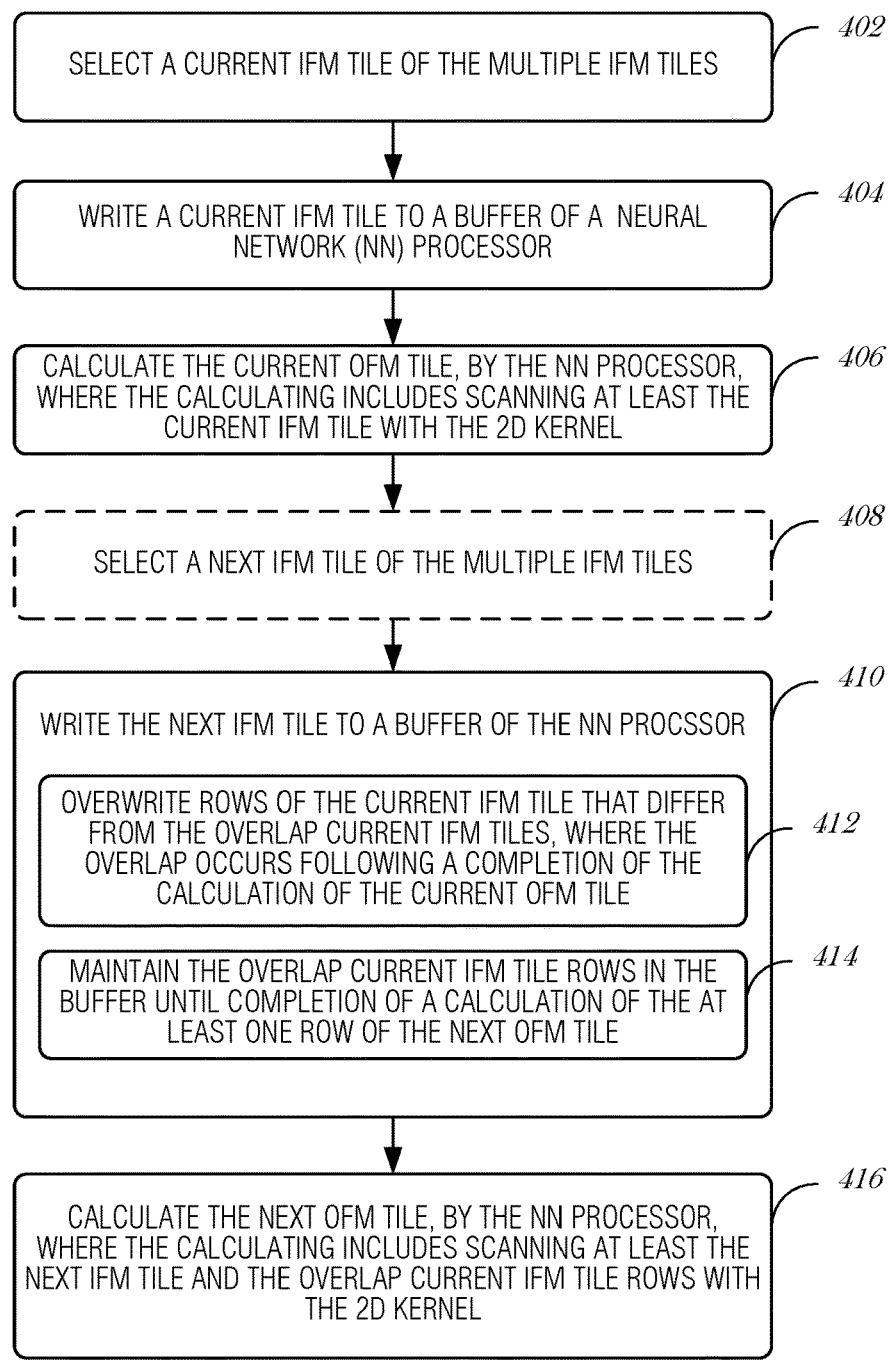
FIG. 4 is a flowchart that illustrates a method for applying a two dimensional (2D) kernel on an input feature map (IFM) that includes multiple IFM tiles, according to an embodiment.

FIG. 4 is a flowchart that illustrates a method 400 for applying a two dimensional (2D) kernel on an input feature map (IFM) that includes multiple IFM tiles, according to an embodiment. The method 400 may start at step 402 of selecting a current IFM tile of the multiple IFM tiles. The selection can be made in any manner. It may implement a sliding window pattern.

Step 402 may be followed by step 404 of writing a current IFM tile to a buffer of a NN processor.

As indicated above the current IFM tile includes overlap current IFM tile rows that are utilized during (a) a calculation of at least one row of a current OFM tile, and (b) a calculation of at least one row of a next OFM tile.

For example, in a kernel of five by file kernel elements the overlap current IFM tile rows are the last four rows of the tile. In general, when the 2D kernel has a first plurality of rows, and there is a stride, then the overlap is the first plurality of rows minus the stride.

Step 404 may be followed by step 406 of calculating the current OFM tile, by the NN processor. The calculating may include scanning at least the current IFM tile with the 2D kernel.

Method 400 may also include optional step 408 of selecting a next IFM tile of the multiple IFM tiles.

Steps 406 and 408, if executed, may be followed by step 410 of writing the next IFM tile to the buffer.

The writing of the next IFM tile to the buffer may include steps 412 and 414.

Step 412 may include overwriting rows of the current IFM tile that differ from the overlap current IFM tiles. The overwriting may occur following a completion of the calculating of the current OFM tile.

Step 414 may include maintaining the overlap current IFM tile rows in the buffer until, at least, completion of the calculation of the at least one row of the next OFM tile (that require one or more of the overlap current IFM tile rows for calculation).

Step 410 may be followed by step 416 of calculating the next OFM tile, by the NN processor. The calculating may include scanning the next IFM tile and the overlap current IFM tile rows with the 2D kernel.

The relationships between the timing of various steps, such as step 406 and 408 may depend on various factors. The factors may include, for example, the size of the buffer (the number of IFM tiles that can be concurrently stored in the buffer), and the manner the selection of the tiles. For example, the selection of one, some, or all current and next IFM tiles may be executed in advance, before executing any calculation.

Steps 402-416 may be repeated multiple times (in which different current and next IFM tiles are selected), for instance, until filtering all of the multiple IFM tiles by the 2D kernel.

The buffer may be a cyclic buffer and method 400 may include maintaining a write pointer (WP) and a compute pointer (CP).

Both pointers may cyclically scan the cyclic buffer. The write pointer points to the next location of the buffer that should be written. The compute pointer points to the first row that should be computed by the NN processor.

Both pointers are calculated during method 400. For example, the write buffer may cyclically scan the buffer but the timing of the writing is according to the timing illustrated in method 400 (for example when to overwrite current IFM rows). The compute pointer scans the rows of the buffer whenever a calculation of an OFM tile is executed. Its value is updated based on the progress of calculations and the content of the buffer.

The IFM that includes the IFM tiles may be a 2D version of a three dimensional (3D) IFM. The 3D IFM may include the following dimensions: width, height, and channels. The 2D version may include a "height" axis and a "channels*width" axis.

The following example uses arbitrary parameters and configurations to demonstrate the cyclic buffer flow, but feature supports any configuration. Input feature map (IFM) is of shape 480×240×64 (Width×Height×Channel), with a kernel window (k)=5×5, padding='same', and stride=1. In a 2D convolution (conv2d) each output pixel is produced from convolving a K×K window along the channel dimension. For each two consecutives' output pixels the input overlaps 'K-stride' pixels ('4' in current example). The mathematical formula (Eq. 1) for conv2d is:

Equation 1

$$\text{out } [i, j, l] = \sum_{d=0}^{\text{Input depth}} \sum_{x=-\lceil \frac{k}{2} \rceil}^{\frac{K}{2}} \sum_{y=-\lceil \frac{k}{2} \rceil}^{\frac{k}{2}} \text{in } [(i*\text{stride} + x), (j*\text{stride} + y), d] * \text{kernel } [x, y, d, l]$$

Another useful formula (Eq. 2) is the number of outputs computed from a given input (note padding is done on edge rows/columns).

$$out_{w,h} = \frac{in_{w/h} - k_{x,y} + padding_{x,y}}{stride_{x,y}} + 1 \quad \text{Equation 2}$$

The overall IFM size is large (~7.4 MB), XNN local memory size is 1 MB and holds the IFM, OFM, and Weights (and bias). IFM will be tiled using tiles of size 480×7×64 (~215 KB). In local memory, a buffer is allocated to fit two IFM tiles (for double buffering). Memory layout is HWC (with C as the most inner dimension).

Figure 5:
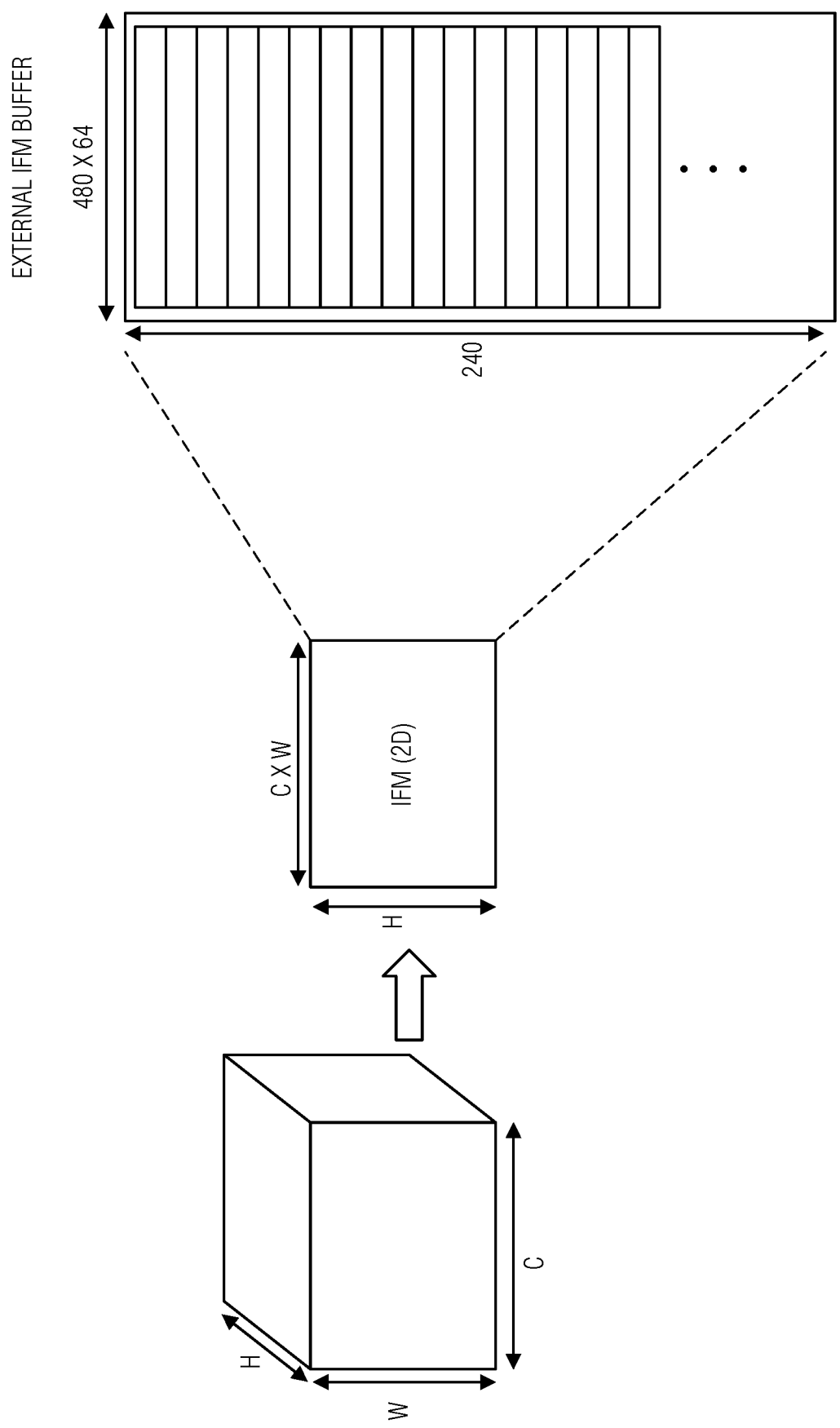
FIG. 5 is an example of a tensor transformation, according to an embodiment.

FIG. 5 is an example of a tensor transformation, according to an embodiment. As illustrated in FIG. 5, a 3D HWC IFM tensor can be transformed to a 2D tensor in the following manner: Axis X: Channels*Width; Axis Y: Height. The 2D tensor is stored in an external IFM buffer.

Figure 6:
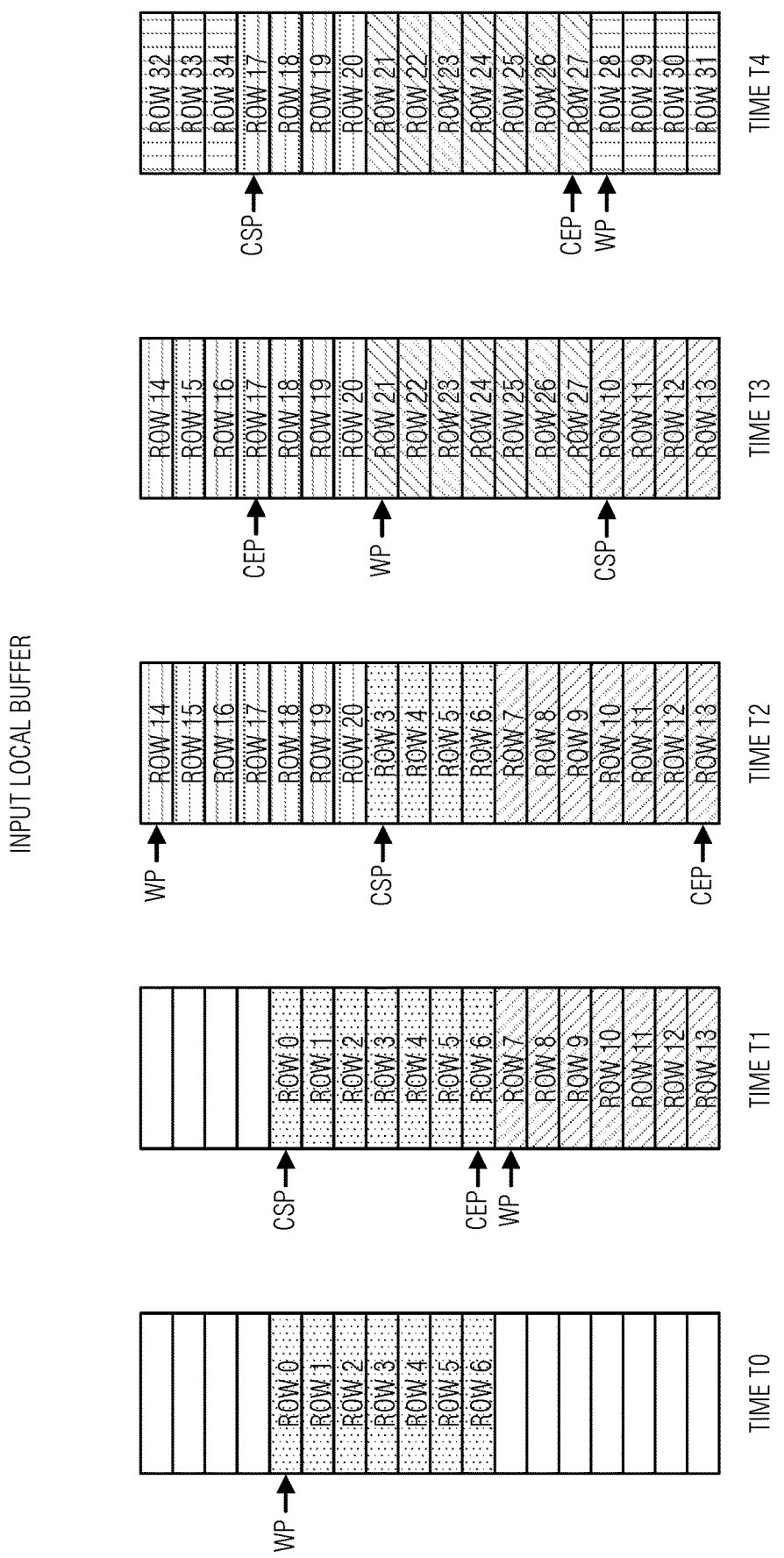
FIG. 6 is an example of an input buffer at different points of time, according to an embodiment.
Figure 7:
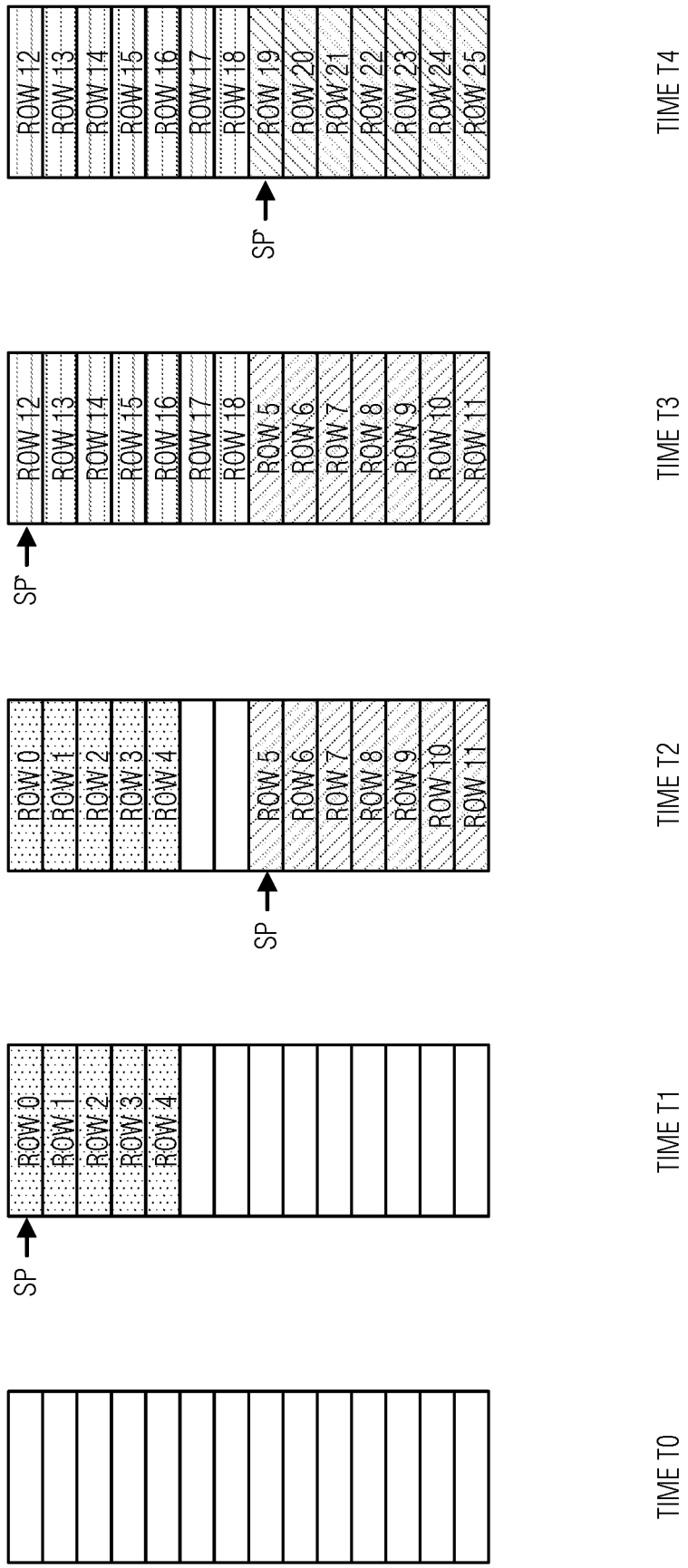
FIG. 7 is an example of an output buffer at the corresponding points of time, according to an embodiment.

FIG. 6 is an example of an input buffer at different points of time, according to an embodiment. FIG. 7 is an example of an output buffer at the corresponding points of time. Note the flow below is controlled by a processing unit which schedules both the I/O requests and the compute engine (which performs the convolution). The I/O engine operates concurrently with the compute engine.

In the examples illustrated in FIGS. 6 and 7, a write pointer (WP) is used to indicate the row where input is imported to, a compute start pointer (CSP) is used to indicate the row where the compute processor (NN processor) starts reading from, the compute end pointer (CEP) is used to indicate the row where the compute processor (NN processor) ends reading from, and the store pointer (SP) is used to indicate the row where the compute processor (NN processor) begins writing to.

1) During a zeroth period of time that starts at point of time T0, (1) a zeroth IFM tile that include rows 0-6 is read from external memory and written to the previously empty input buffer. It is written to lines 5-11 of the input buffer. Lines 1-4 and 12-18 remain empty. Notice first four rows are left empty, which is the overlap: 'K-stride'.

2) During a first period of time that starts at point of time T1, (1) the NN processor (e.g., compute engine) calculates the zeroth OFM tile (of five rows), and (2) the first IFM tile that includes rows 7-13 is written to lines 12-18 of the input buffer. Note, due to padding size, the "edge" tiles will have padding of $$\frac{k}{2}$$

rows, in current example k=5, padding=2. XNN does the padding "on the fly", no need to allocate memory for it in the input local buffer. Using Equation 2 from above, the number of rows computed for the first/edge tile is:

$$\frac{7-5+2}{1} + 1 = 5.$$

The non-edge tiles will always output 7 rows. For example, see time T2 discussion.

3) During a second period of time that starts at point of time T2, (1) the zeroth OFM tile is exported from the output local buffer, (2) the NN processor calculates the first OFM tile (of seven rows), note that IFM rows 3-6 are reused in local memory, and (3) the second IFM tile that includes rows 14-20 is imported from the external IFM buffer to lines 1-7 of the input buffer. Various overlap rows (rows 3-6) of the zeroth IFM are not overwritten while other rows (rows 0-2) are overwritten.

4) During a third period of time that starts at point of time T3, (1) the first OFM tile is exported from the output buffer, (2) the NN processor calculates the second OFM tile (of seven rows) generating OFM rows 12-18, and (3) the third IFM tile that includes rows 21-27 is written to lines 8-14 of the input buffer. Even the overlap rows (rows 3-6) of the zeroth IFM are overwritten. XNN core warps around (CEP<CSP). Note that although the input buffer from row 10 to row 17 are physically not consecutive, it is seen by the compute processor as consecutive memory due to the cyclic buffer support.

5) During a fourth period of time that starts at point of time T4, (1) the second OFM tile is exported from the output buffer, (2) the NN processor calculates the third OFM tile (of seven rows), and (3) the fourth IFM tile that includes rows 28-34 is written to lines 15-18 and 1-3 of the input buffer. Even the overlap rows (rows 10-13) of the first IFM are overwritten. Note that the compute pointer has to move to row 17 of the second IFM because a portion of the second IFM (rows 14-16) is overwritten by the fourth IFM tile.

6) These steps are repeated until all outputs are computed.

At different periods of time, different input and OFM tiles act as current and next OFM tile respectively.

It should be noted that the selective fetching, storing and processing of rows "covers" one dimension of the 2D kernel (for example the height or vertical axis of the 2D kernel), regarding calculations at the start of the row and the end of each row, border approximations may be applied.

In summary, four rows were reused from local memory in each tile (except for the first). The total memory reused in local memory, as oppose to reimporting:

1) Num Tiles=(240/7)=35
2) 480*64*(35−1)*4=~4.1M

Out of 34 tiles, 19 tiles had a "warp around": 480*64*19*4=~2.3M I/O reused.

As a result, by introducing an efficient circular buffer in XNN, the I/O bandwidth traffic is reduced, and increases the efficiency of the CNNs.

Figure 8:
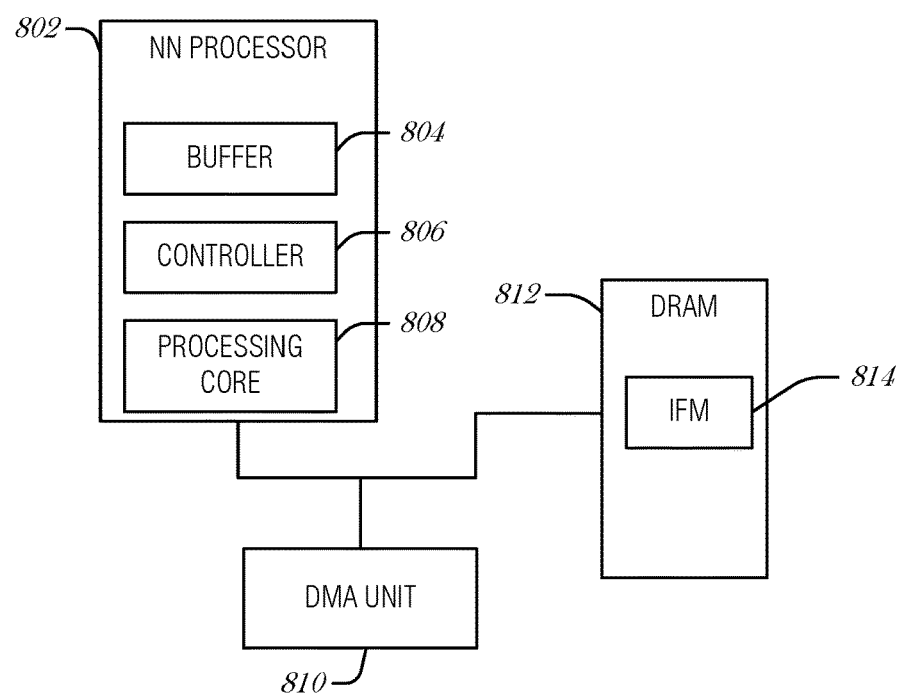
FIG. 8 illustrates an example of integrated circuit, according to an embodiment.

FIG. 8 illustrates an example of integrated circuit 800, according to an embodiment.

The integrated circuit 800 may be a system-on-chip for vehicle related purposes, for example, for applying autonomous driving and/or advance driver assistance system (ADAS) functionality. Such a system on chip may be one of the EYEQ™ processors of MOBILEYE™, an Intel company.

The integrated circuit 800 may be or may include an NN processor 802 that includes a buffer 804, a controller 806, and a processing core 808 for calculating the OFM tiles.

The controller 806 may control the fetching of rows of IFM tiles to the buffer 804. The controller 806 may use a direct memory access (DMA) unit 810 for fetching the IFM tiles from a remote or external memory unit such as DRAM 812. The DRAM 812 and the DMA unit 810 are illustrated as part of the integrated circuit that also includes the NN processor 802 but they may reside in different integrated circuits.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 9:
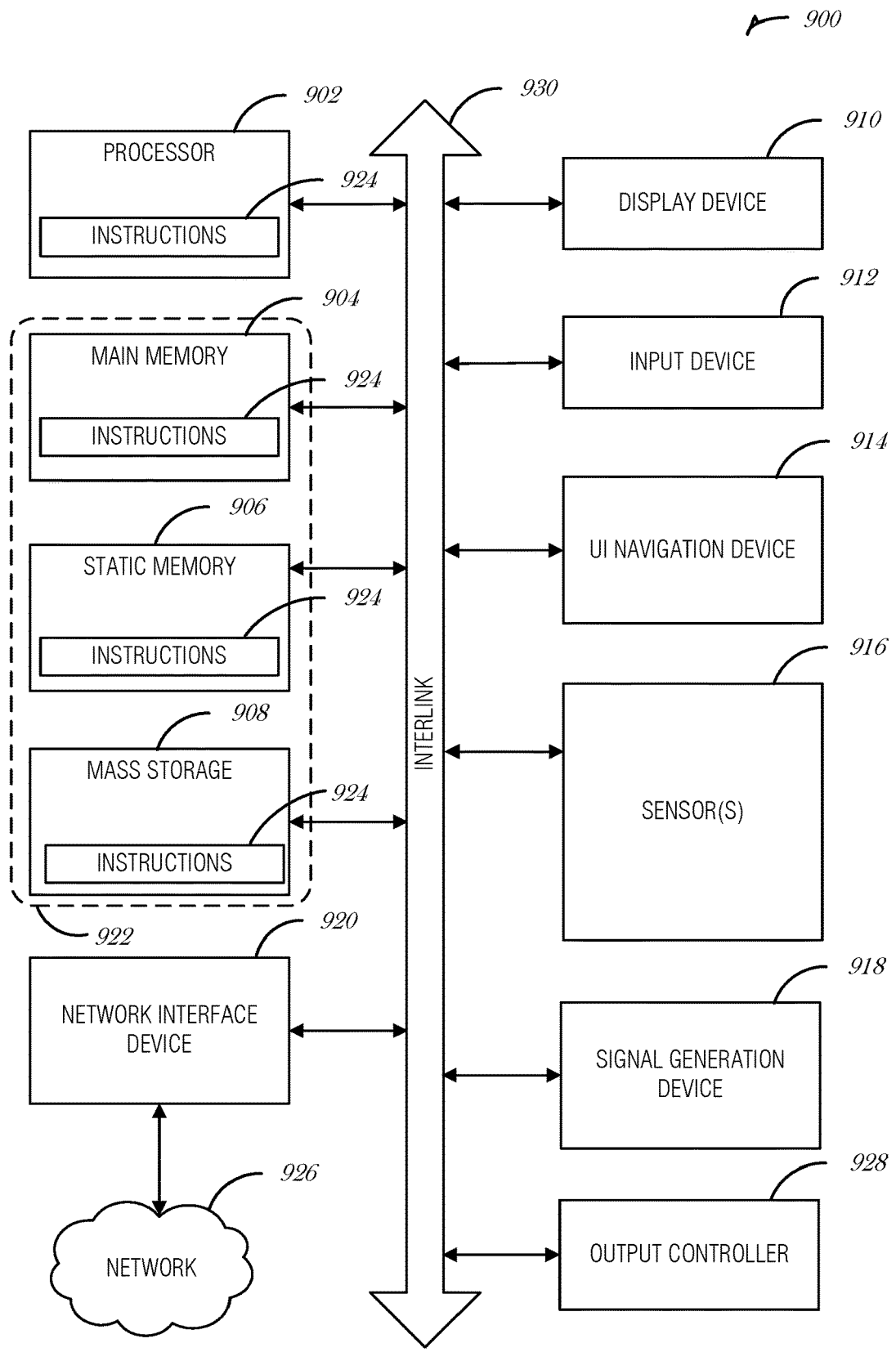
FIG. 9 is a block diagram illustrating a machine in the example form of a computer system, within which a set or sequence of instructions may be executed to cause the machine to perform any one of the methodologies discussed herein, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 9 is a block diagram illustrating a machine in the example form of a computer system 900, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, gyrometer, magnetometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Any method describing steps may include more steps than those illustrated in the figure, only the steps illustrated in the figure, or substantially only the steps illustrate in the figure. The same applies to components of a device, processor or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for applying a two dimensional (2D) kernel on an input feature map (IFM) that comprises multiple IFM tiles, the method comprising:
    selecting a current IFM tile of the multiple IFM tiles;
    writing the current IFM tile to a buffer of a neural network (NN) processor, wherein the current IFM tile comprises overlap current IFM tile rows that are utilized during (a) a calculation of at least one row of a current output feature map (OFM) tile, and (b) a calculation of at least one row of a next OFM tile;
    calculating the current OFM tile, by the NN processor, wherein the calculating comprises scanning at least the current IFM tile with the 2D kernel;
    selecting a next IFM tile of the multiple IFM tiles;
    writing the next IFM tile to the buffer, wherein the writing of the next IFM tile to the buffer comprises:
        overwriting rows of the current IFM tile that differ from the overlap current IFM tiles, wherein the overwriting occurs following a completion of the calculating of the current OFM tile; and
        maintaining the overlap current IFM tile rows in the buffer until, at least, completion of a calculation of the at least one row of the next OFM tile; and
    calculating the next OFM tile, by the NN processor, wherein the calculating comprises scanning the next IFM tile and the overlap current IFM tile rows with the 2D kernel.

2. The method according to claim 1, comprising repeating the selecting of the current IFM tile and of the next IFM input tile until filtering all of the multiple IFM tiles by the 2D kernel.

3. The method according to claim 1, wherein the NN processor is a convolution NN processor.

4. The method according to claim 3, wherein the 2D kernel is a 2D convolution kernel.

5. The method according to claim 3, wherein the 2D kernel is a 2D deconvolution kernel.

6. The method according to claim 1, wherein the buffer is a cyclic buffer and wherein the method comprises maintaining a write pointer and a compute pointer.

7. The method according to claim 1, wherein the IFM is a 2D version of a three dimensional IFM.

8. An integrated circuit comprising:
    a neural network (NN) processor that comprises a buffer; and
    a controller, wherein the controller is configured to:
        select a current input feature map (IFM) tile of multiple IFM tiles of the IFM; and
        write a current IFM tile to the buffer; wherein the current IFM tile comprises overlap current IFM tile rows that are utilized during (a) a calculation of at least one row of a current output feature map (OFM) tile, and (b) a calculation of at least one row of a next OFM tile;
    wherein the NN processor is configured to calculate the current OFM tile, wherein the calculating comprises scanning at least the current IFM tile with a two dimensional (2D) kernel;
    wherein the controller is further configured to:
        select a next IFM tile of the multiple IFM tiles; and
        write a next IFM tile to the buffer, wherein writing the next IFM tile to the buffer comprises:
            overwriting rows of the current IFM tile that differ from the overlap current IFM tiles, wherein the overwriting occurs following a completion of the calculating of the current OFM tile; and
            maintaining the overlap current IFM tile rows in the buffer until, at least, completion of a calculation of the at least one row of the next OFM tile; and
    wherein the NN processor is further configured to calculate the next OFM tile, wherein the calculating comprises scanning the next IFM tile and the overlap current IFM tile rows with the 2D kernel.

9. The integrated circuit according to claim 8, wherein the controller is configured to repeat a selection of the current IFM tile and of the next IFM input tile until filtering all of the multiple IFM tiles by the 2D kernel.

10. The integrated circuit according to claim 8, wherein the NN processor is a convolution NN processor.

11. The integrated circuit according to claim 10, wherein the 2D kernel is a 2D convolution kernel.

12. The integrated circuit according to claim 10, wherein the 2D kernel is a 2D deconvolution kernel.

13. The integrated circuit according to claim 8, wherein the buffer is a cyclic buffer and wherein the controller is configured to maintain a write pointer and a compute pointer.

14. The integrated circuit according to claim 8, wherein the IFM is a 2D version of a three dimensional IFM.

15. The integrated circuit according to claim 8, wherein the 2D kernel has a first plurality (p1) of rows, wherein there are a second plurality (p2) of overlap current IFM tile rows, wherein $p1=1+2*p2$.

16. A non-transitory computer readable medium for applying a two dimensional (2D) kernel on an input feature map (IFM) that comprises multiple IFM tiles, the non-transitory computer readable medium that stores instructions for:
    selecting a current IFM tile of the multiple IFM tiles;
    writing a current IFM tile to a buffer of a neural network (NN) processor, wherein the current IFM tile comprises overlap current IFM tile rows that are utilized during (a) a calculation of at least one row of a current output feature map (OFM) tile, and (b) a calculation of at least one row of a next OFM tile;

calculating the current OFM tile, by the NN processor, wherein the calculating comprises scanning at least the current IFM tile with the 2D kernel;

selecting a next IFM tile of the multiple IFM tiles;

writing a next IFM tile to the buffer, wherein writing the next IFM tile to the buffer comprises:

overwriting rows of the current IFM tile that differ from the overlap current IFM tiles, wherein the overwriting occurs following a completion of the calculating of the current OFM tile; and maintaining the overlap current IFM tile rows in the buffer until, at least, completion of a calculation of the at least one row of the next OFM tile; and calculating the next OFM tile, by the NN processor, wherein the calculating comprises scanning the next IFM tile and the overlap current IFM tile rows with the 2D kernel.

17. The non-transitory computer readable medium according to claim 16, comprising instructions for repeating the selecting of the current IFM tile and of the next IFM input tile until filtering all of the multiple IFM tiles by the 2D kernel.

18. The non-transitory computer readable medium according to claim 16, wherein the buffer is a cyclic buffer and wherein a write pointer and a compute pointer are maintained.

19. The non-transitory computer readable medium according to claim 16, wherein the IFM is a 2D version of a three dimensional IFM.

\* \* \* \* \*